United States Patent [19]
Stevenson

[11] Patent Number: 5,167,289
[45] Date of Patent: Dec. 1, 1992

[54] AIR SPRING LOAD MONITORING SYSTEM

[76] Inventor: David L. Stevenson, P.O. Box 308, Gilmer, Tex. 75644

[21] Appl. No.: 693,556

[22] Filed: Apr. 30, 1991

[51] Int. Cl.$^5$ .................. G01G 19/10; G01G 5/04; G01G 23/32
[52] U.S. Cl. .................. 177/141; 177/209; 177/178
[58] Field of Search .............. 177/141, 209, 254, 178

[56] References Cited

U.S. PATENT DOCUMENTS

| | | |
|---|---|---|
| 2,759,356 | 8/1956 | Blackmon et al. . |
| 2,867,433 | 1/1959 | Bergenheim et al. .............. 265/40 |
| 3,306,383 | 2/1967 | Saxton et al. . |
| 3,331,458 | 7/1967 | Van Raden et al. . |
| 3,857,093 | 12/1974 | Green . |
| 4,399,881 | 8/1983 | Theurer et al. . |
| 4,456,084 | 6/1984 | Miller .............. 177/141 |
| 4,651,838 | 3/1987 | Hamilton et al. .............. 177/209 |
| 4,673,047 | 6/1987 | Harbour . |
| 4,728,922 | 3/1988 | Christen et al. . |
| 4,812,806 | 3/1989 | Freeman . |
| 4,835,719 | 5/1989 | Sorrells . |
| 4,852,674 | 8/1989 | Gudat .............. 177/141 |
| 4,854,407 | 8/1989 | Wagner .............. 177/141 |
| 4,917,197 | 4/1990 | Waite, Jr. . |

Primary Examiner—George H. Miller, Jr.
Attorney, Agent, or Firm—Dennis T. Griggs

[57] ABSTRACT

An air spring load monitoring system provides a vehicle operator with an on-board visual display of the load distribution imposed on each axle from front to rear of a truck and trailer, and displays differential loads imposed from side to side across each axle as a result of local overloading caused by unequal load distribution. Pneumatic transducers produce analog output signals proportional to the internal air pressure of each air spring as an accurate indicator of payload distribution. Load data is presented by load display groups in which visual display elements are positioned in spaced relation along a scale representative of a predetermined air spring load range. The visual display elements of each group are positioned in side by side relation for visual comparison to each other and to the scale. Each visual display element is representative of a predetermined load range increment. A signal conversion circuit drives a predetermined visual display element in each display group which corresponds with the load range increment containing the air spring load value represented by the analog output signal.

1 Claim, 3 Drawing Sheets

AIR SPRING LOAD MONITORING SYSTEM

FIELD OF THE INVENTION

This invention relates generally to vehicle load monitoring systems, and in particular to apparatus for monitoring the cargo load distribution in vehicles having an air spring suspension.

BACKGROUND OF THE INVENTION

Air springs are used for load leveling and ride height control on cargo vehicles. Typically, air springs are used in combination with shock absorbers and are installed between the axle and the chassis. When the vehicle is unloaded, the vehicle chassis is supported by its shock absorbers and mainsprings. When the vehicle is to be loaded, the air springs are inflated and the chassis is raised relative to the axle to a desired ride height. Thus, when loaded, the vehicle is supported by its mainsprings, its shock absorbers and the air springs which cooperate to dampen relative motion between the chassis and the axles.

The pressure in each air spring must be adjusted to maintain the chassis level at the desired ride height, for example, during loading and unloading. This may be accomplished manually and automatically with the aid of ride height sensors, control valves and a source of compressed air.

It is generally desirable to load a cargo vehicle to the maximum gross load limit as set by the Interstate Commerce Commission and state regulations for common carriers. Weighing stations are available which certify that the gross weight of the load does not exceed the limit prescribed by law. Additionally, each vehicle may have specific load limits for each individual axle; for example, the front axle typically has a lower load limit than the drive axle. Thus it is possible that the gross cargo load of a vehicle may not exceed the legal limit, but may impose an excessive load on the front axle because of uneven load distribution. Improper payload distribution causes overload on critical vehicle components such as strut, frame and tires. Unequal load distribution can cause differential loading across each axle, which may cause an unsafe side sway condition which affects trailer stability and handling as well as imposing excessive torsion loads on the frame and excessive compression loads on a particular tire, its mainspring and strut support.

Accordingly, it is generally desirable to balance the cargo load axle to axle from front to rear and to balance the load across each axle from tire to tire. In addition to achieving the maximum legal payload, care must be taken not to exceed the load limit for each axle. Generally, the operator desires to minimize the loading time while achieving the maximum allowable payload during initial loading. That is, the operator desires to quickly load up to the legal limit and maximize his profit by utilizing the full hauling capacity of the trailer. While doing this, the operator also desires to reduce the maintenance costs caused by overloading and increase profit potential by minimizing maintenance downtime.

Uniform load distribution is made difficult since the size and weight cargo units may vary substantially. This can cause localized overloading from front to rear of the trailer and localized overloading from tire to tire across each axle. Such uneven load distribution can impose excessive torsion loading forces on the frame which may cause structural failure and accelerated wear on tires, springs, struts and electric drive motors which are subjected to localized overloading.

Moreover, some loads, although initially balanced, may shift during transit, thereby causing an unbalanced load condition. Moreover, cargo loads may become seriously unbalanced as a result of scheduled off-loading of cargo at different destinations.

DESCRIPTION OF THE PRIOR ART

Conventional vehicle load monitoring systems include sensors for detecting gross cargo weight and provide an alarm signal if an overload condition is detected. In one load monitoring system, pressure sensors sense the hydraulic pressure in the struts of a vehicle to calculate gross load weight. The signal from the sensors is sent to a microprocessor which calculates the gross load of the vehicle. A warning signal alerts the operator that the load limit has been exceeded. Some systems utilize position sensors to detect vertical displacement of the axle relative to the frame as a result of the cargo load force. The output of the position sensor is used for calculating the gross load weight.

Load calculations are displayed by alphanumeric digital display devices and by analog display devices. Some load monitoring systems display the weight distribution on each axle in addition to providing an indication of gross payload. However, such information has not been displayed in a format which is easily usable by an operator during loading and during transit. Moreover, the conventional load monitoring systems have not provided an indicator for displaying differential loads imposed across an axle caused by local overloading resulting from uneven load distribution. It will be appreciated that the frame, suspension, tires, electric drive motors and lift cylinders will undergo accelerated wear when subjected to such localized overloading, even though the gross payload may not exceed the legal limit.

The following U.S. patents are exemplary of conventional vehicle load monitoring systems which include load sensing and display devices:

| PATENT NO. | INVENTOR | ISSUE DATE |
|---|---|---|
| 2,759,356 | Blackmon, et al. | 08/21/56 |
| 2,867,433 | Bergenheim, et al. | 01/06/59 |
| 3,306,383 | Saxton, et al. | 02/28/67 |
| 3,331,458 | Van Raden, et al. | 07/18/67 |
| 3,857,093 | Green | 12/24/74 |
| 4,399,881 | Theurer, et al. | 08/23/83 |
| 4,651,838 | Hamilton, et al. | 03/24/87 |
| 4,673,047 | Harbour | 06/16/87 |
| 4,728,922 | Christen, et al. | 03/01/88 |
| 4,812,806 | Freeman | 03/14/89 |
| 4,835,719 | Sorrells | 05/30/89 |
| 4,852,674 | Gudat | 08/01/89 |
| 4,917,197 | Waite, Jr. | 04/17/90 |

OBJECTS OF THE INVENTION

A general object of the present invention is to provide an improved vehicle load monitoring system for assisting a vehicle operator in correctly positioning cargo and maximizing the gross payload without exceeding the legal load limit, and without imposing excessive loading on vehicle components.

A related object of the present invention is to provide an improved vehicle load monitoring system for indicating the load distribution from axle to axle along the length of a truck and trailer.

Another object of the present invention is to provide an improved vehicle load monitoring system of the character described, in which the load distribution applied from wheel to wheel along each axle is indicated.

Yet another object of the present invention is to provide a vehicle load monitoring system having an improved visual display for presenting the payload distribution on a truck and trailer.

A related object of the present invention is to provide an improved vehicle load monitoring system of the character described, which provides a visual indication of localized overloading on a single wheel or axle as a result of improper loading, load shifting during transit or scheduled off-loading.

Still another object of the present invention is to provide a vehicle load monitoring system having an improved display in which the relative distribution of payload from axle to axle along a truck and trailer and from wheel to wheel along a single axle is intuitively obvious at all times during loading and transit.

SUMMARY OF THE INVENTION

The air spring load monitoring system of the present invention provides a vehicle operator with an on-board visual display which presents the load distribution imposed on each axle from front to rear of the truck and trailer, and displays differential loads imposed from wheel to wheel across each axle as a result of local overloading caused by unequal load distribution. The system utilizes air spring pressure as an accurate indicator of payload. Pneumatic transducers produce analog output signals proportional to the internal air pressure of each air spring. A signal conversion/scaling circuit receives the air spring analog load signals for driving visual display elements of separate display groups corresponding with each axle/air spring combination.

Each load display group includes a scale representative of a predetermined air spring load range and an array of visual display elements positioned at spaced locations along the scale. Each visual display element is representative of a predetermined load range increment. The signal conversion/scaling circuit separately drives the visual display elements of each display group in correspondence with the load range increment containing the air spring load value represented by the analog output signal. The display elements of each group are positioned in side by side relation for visual comparison to each other and to the scale.

In an alternative embodiment, first and second load display groups are provided for each axle, with each load display group having visual display elements positioned along a scale representative of a predetermined air spring load range. The visual display elements of each group are aligned in side by side relation for visual comparison to each other and to the scale. According to this arrangement, differential loads imposed across an axle from side to side are intuitively obvious at a glance, and do not require a mental calculation or other interpretation of alphanumeric data.

Operational features and advantages of the present invention will be appreciated by those skilled in the art upon reading the detailed description which follows with reference to the attached drawings, wherein:

DETAILED DESCRIPTION OF THE PREFERRED EMBODIMENT

Figure 1:
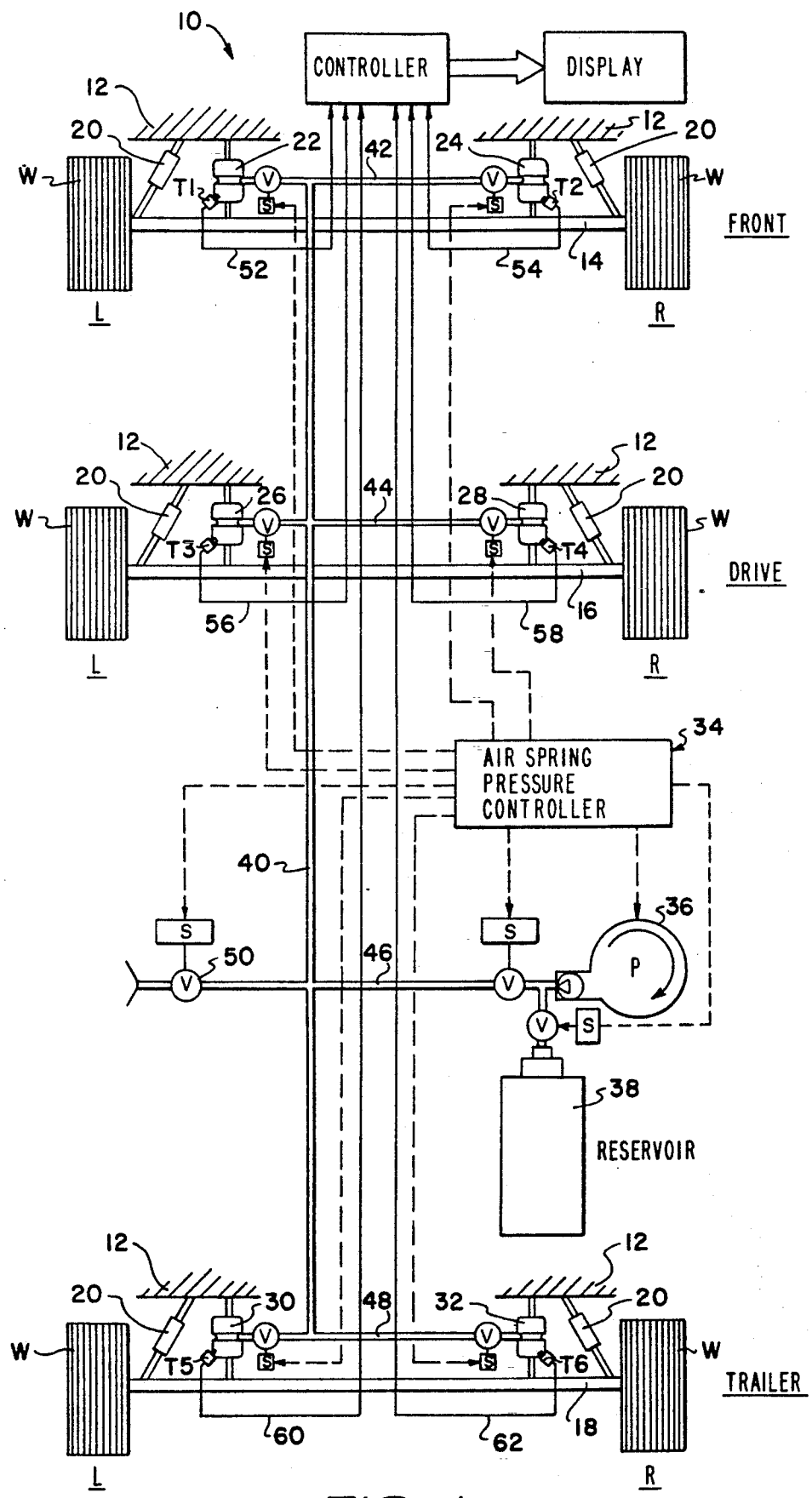
FIG. 1 is a simplified schematic diagram of an air spring suspension system for a vehicle having multiple axles.

In the description which follows, like parts are indicated throughout the specification and drawings by the same reference numerals, respectively.

Referring now to FIG. 1, the air spring load monitoring system 10 of the present invention is described in combination with a vehicle chassis 12 having a front axle 14, a drive axle 16 and a trailer axle 18. Left and right wheels W are coupled to the opposite ends of each axle by bearings (not shown). Each axle and wheel assembly is suspended from the chassis by shock absorbers 20, mainsprings (not shown) and inflatable air springs 22, 24, 26, 28, 30 and 32, respectively. Each air spring includes an inflatable bellows housing which is interposed between the axle and the chassis adjacent each wheel. Each air spring is expandable from a deflated, collapsed configuration (not shown) so that the chassis 10 rides upon the shock absorbers and mainsprings, and is expandable when inflated by compressed air to a desired inflation state wherein the elevation of the chassis relative to the axle and ground is increased to a desired ride height level.

Inflation and deflation of the individual air springs is coordinated by an air spring pressure controller 34 which opens and closes solenoid controlled valves V for charging and relieving the pressure within each air spring with compressed air delivered from a pump 36 and compressed air reservoir 38. The pump 36 is energized by the vehicle DC electrical power system and selectively charges the reservoir 38 or charges compressed air into a main air supply conduit 40. Branch conduits 42, 44, 46 and 48 are connected to the main conduit for charging and relieving each air spring. The main supply conduit and branch conduits are relieved through a solenoid controlled discharge valve 50. According to this arrangement, each air spring is inflated with compressed air as required to obtain chassis leveling, and to produce a desired ride height level. The air spring pressure controller 34 may be manually operated from a control console, or may be automatically operated according to programmed ride height level and load factors.

Pneumatic transducers T1, T2, T3, T4, T5 and T6 are coupled to each air spring. Each pressure sensor includes a probe communicating with the air spring inflation chamber for detecting its internal pressure. Each transducer produces an analog output signal whose magnitude is proportional to the sensed air pressure. The analog signals are conducted to the input of analog/digital converters by signal conductors 52, 54, 56, 58, 60 and 62.

Figure 2:
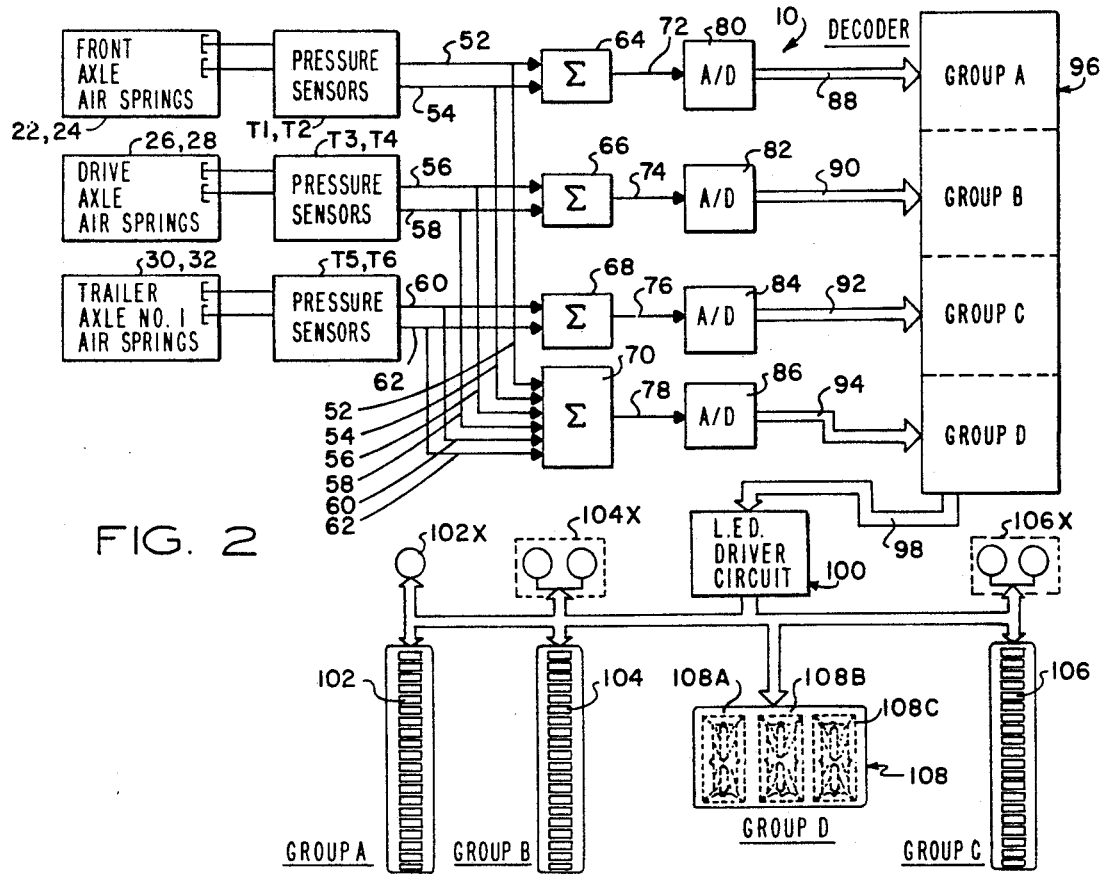
FIG. 2 is a block diagram of an air spring load monitoring system constructed according to one aspect of the present invention.

Referring to FIG. 2, the analog output signals produced by the pressure transducers T1 and T2 are combined and scaled in summing amplifiers 64, 66, 68 and 70, respectively. The summing amplifiers 64, 66 and 68 produce analog output signals 72, 74, 76, respectively, which are proportional to the combined air pressures sensed by the transducers in both air springs on each axle. The summing amplifier 70 produces an analog output signal 78 which is proportional to the total air pressure sensed by the transducers in all air springs. In this embodiment, the total loading on each axle provides a visual display of the load distribution from axle to axle along the length of a multiple axle truck and trailer, and the overall total payload is also indicated.

The scaled analog output signals 72, 74, 76 and 78 are digitized by analog/digital converters 80, 82, 84 and 86, respectively. The outputs 88, 90, 92 and 94 of each analog/digital converter are bytes of digital data representative of the amplitudes of the scaled analog pressure signals. The digitized pressure signals are latched into a signal conversion decoder circuit 96 which produces decoded group output signals through a signal bus 98 to a driver circuit 100 to display Groups A, B, C and D.

Each display Group A, B and C includes multiple visual display elements 102, 104 and 106, respectively, which are arranged in linear arrays. Display Group D includes three alphanumeric, seven segment light emitting diode (L.E.D.) elements 108A, 108B, 108C for indicating a three digit number corresponding to percent total weight. Preferably, each display Group A, B and C includes multiple display elements, with each visual display element being representative of a predetermined load range increment. In the examples shown in FIG. 2 and FIG. 3, there are twenty display elements 102 per display group, with each display element representing 5 percent of the total allowable load for a specific axle. L.E.D. display elements 102X, 104X and 106X are energized when an overload condition for axle Group A, Group B or Group C is detected, respectively. In this instance, display Group A corresponds with the front axle, display Group B corresponds with the drive axle group and display Group C corresponds with the trailer axle group. The display elements of each group are positioned in side by side relation for convenient visual comparison to each other and to a load range scale from 10 percent to 100 percent as shown in FIG. 3.

Figure 3:
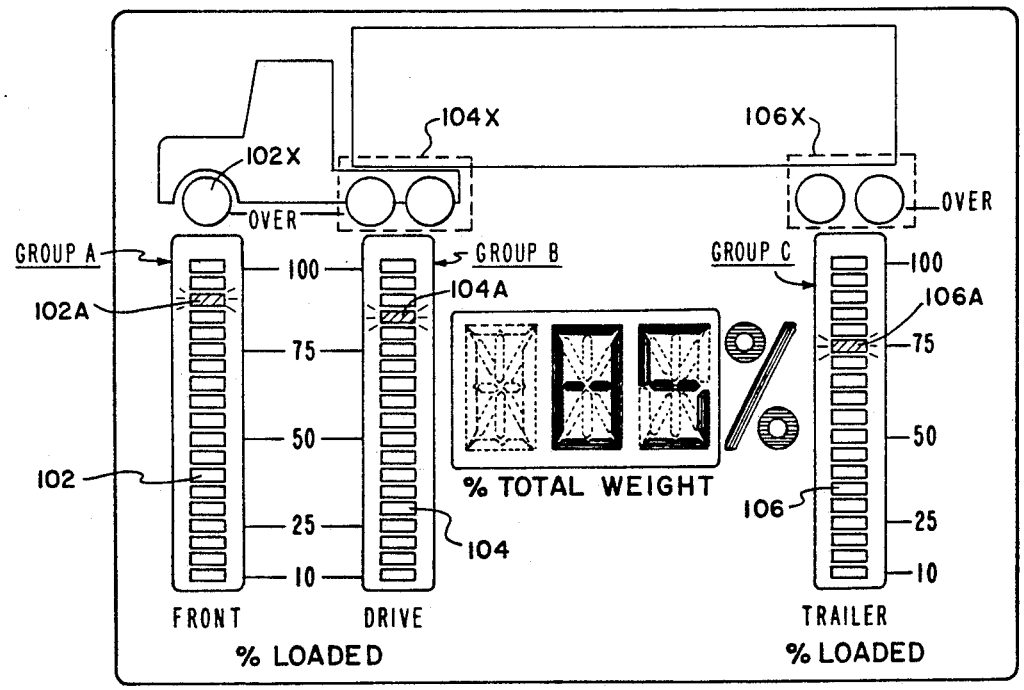
FIG. 3 is a front elevational view which illustrates a preferred embodiment of a visual display of the present invention.

The loading indicated by the Group D display 108 in FIG. 3 shows that the trailer has been loaded to 85 percent of its total allowable weight (80,000 lbs. gross), with the front axle 14 being loaded to 95 percent of its allowable weight (12,000 lbs. gross), the drive axle 16 being loaded to 85 percent of its allowable weight (34,000 lbs. gross), and the rear axle 18 being loaded to 75 percent of its allowable weight (34,000 lbs. gross). The display shown in FIG. 3 indicates that the trailer could accept additional payload toward the rear axle 18 of the trailer, with the front axle 14 being within 5 to 10 percent of its permissible limit. The illumination of display element 102A in the front axle Group A indicates that the front axle 14 has a loading of at least 90 percent but less than 95 percent of its rated maximum loading; the illumination of Group B L.E.D. element 104A indicates that the drive axle group 16 has a loading of at least 85 percent but less than 90 percent of its rated maximum loading; and the illumination of Group C L.E.D. element 106A indicates a loading of at least 75 percent but less than 80 percent of the rated loading for the rear axle group 18.

Thus the operator will proceed cautiously with further loading of cargo and will terminate the loading operation when the front axle Group A indicator shows 100 percent or when the alphanumeric total weight Group D indicator shows 100 percent. The operator will then check the chassis level indicators and will charge or relieve the air springs as necessary to obtain a desired ride height and level condition.

During transit, the relative distribution of payload from axle to axle along the truck and trailer is intuitively obvious at a glance. Should the load shift in response to adverse road conditions, the display elements of the drive axle display Group B and the trailer axle display Group C will immediately signal a change in payload distribution.

During loading, the display elements of the front axle display Group A, the drive axle display Group B, the trailer axle display Group C, and the total weight display Group D give the operator a continuous indication of how much and how fast the truck and trailer are being loaded. It also alerts the operator of any overage of weight on any single axle and the total payload on all axles combined. Accordingly, the operator can use the group displays as a reference for correctly positioning cargo during loading to achieve the maximum total payload while avoiding overloading any single axle or group of axles by correctly positioning the cargo as loading progresses. Additionally, the Group A and Group B display indicators for the front axle and drive axle group provide an objective reference for correctly positioning the engaged location of the fifth wheel/trailer coupling within its permissible coupling range to avoid overloading the front axle 14.

Figure 4:
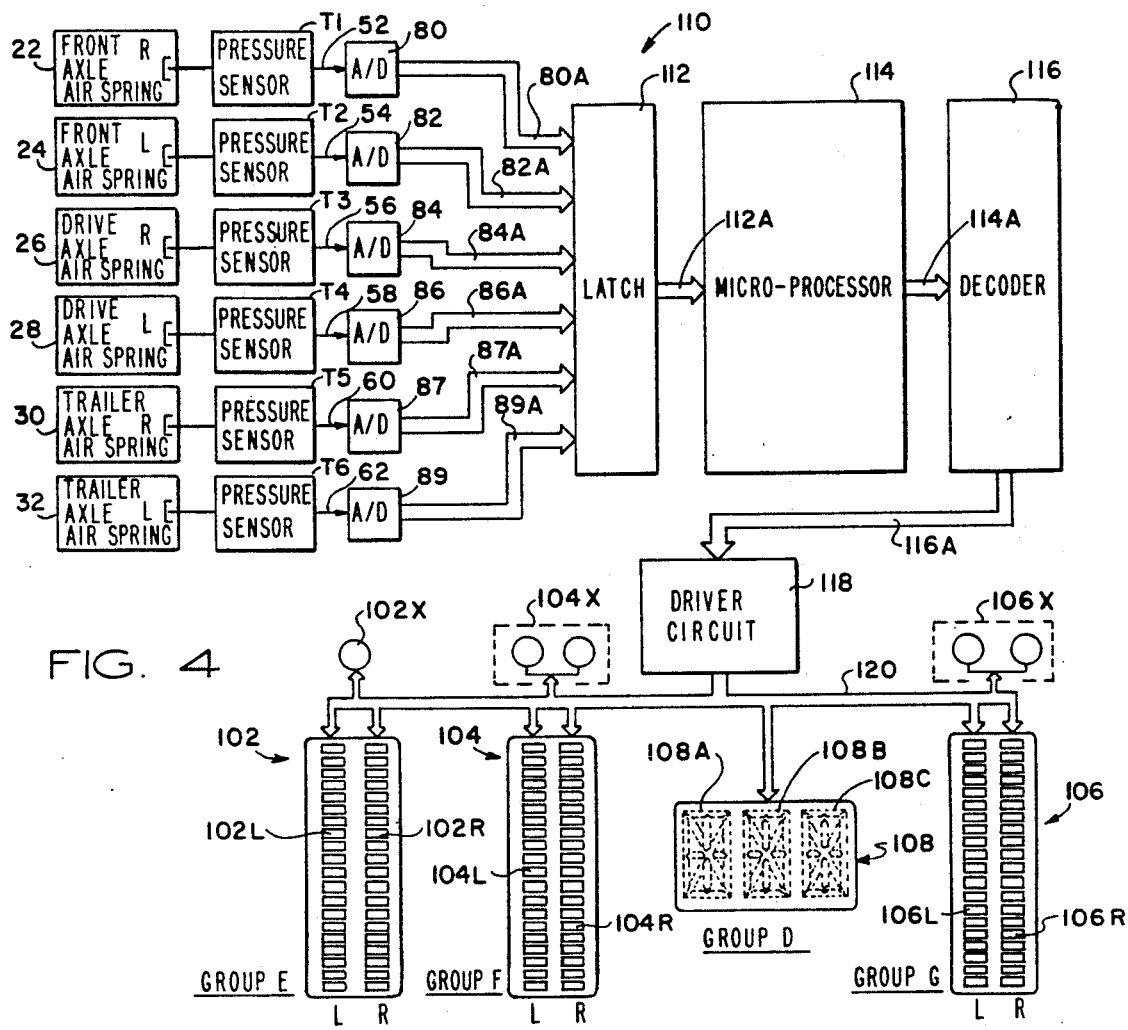
FIG. 4 is a simplified block diagram of an air spring monitoring system constructed according to an alternative embodiment of the present invention; and, FIG. 5 is a front elevational view of a visual display constructed according to an alternative embodiment of the present invention.
Figure 5:
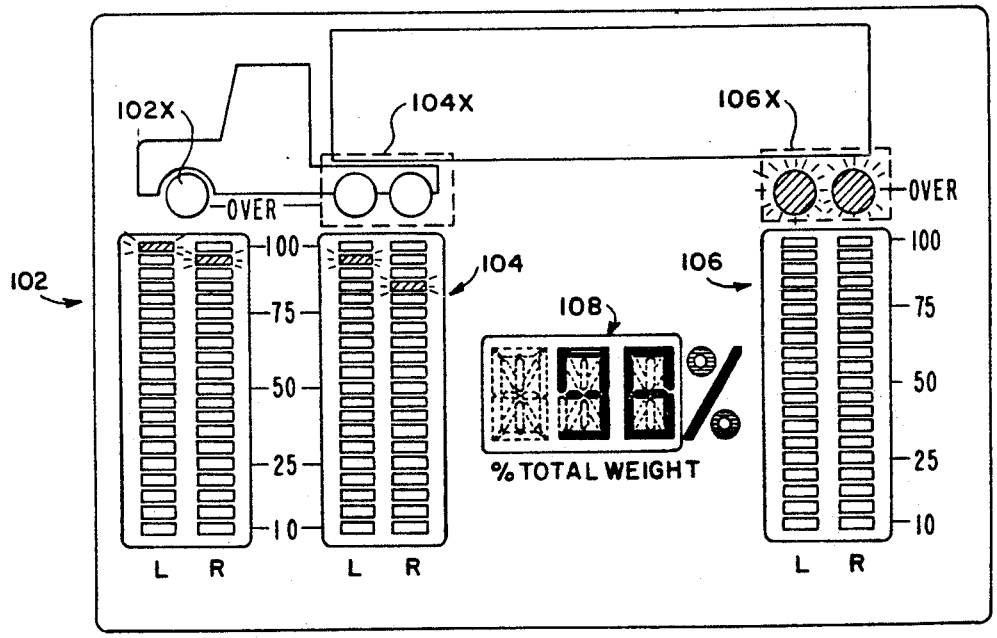

Referring now to FIG. 4 and FIG. 5, a load display system 110 constructed according to an alternative embodiment of the invention is illustrated. The load display system 110 includes load display Groups E, F and G for each axle, with each load display group having left and right linear arrays of visual display elements 102L, 102R, 104L, 104R and 106L, 106R. Each array is positioned along a scale representative of a predetermined air spring load range, with the visual display elements of each group being aligned in side by side relation for visual comparison to each other and to scale index marks. According to this arrangement, differential loads imposed across each axle from side to side are intuitively obvious at a glance, and do not require a mental calculation or other interpretation of alphanumeric data for the operator to be immediately aware of a load imbalance during loading, and also to become immediately aware of a load imbalance caused by load shifting during transit.

In this embodiment, the analog output signals produced by the pressure transducers T1-T6 are input individually to analog-to-digital converters 80, 82, 84, 86, 87 and 89, respectively. Each analog-to-digital converter includes an input scaling amplifier for adjusting the amplitude of the pressure of each pressure sensor to correspond with the unloaded—full load pressure range of each air spring, for example, 0-100 psi in each air spring on the front axle, and 0-70 psi in each air spring on the drive axle and the rear axle.

The scaled analog signals 52, 54, 56, 58, 60 and 62 are digitized by the analog/digital converters which produce digital output signals 80A, 82A, 84A, 86A, 87A and 89A, respectively. Each digital signal output contains bytes of digital data representative of the amplitudes of the scaled analog pressure signals. The digital pressure signals are input to a six port latch 112, which loads the digital data pressure signals into a microprocessor 114 synchronously with a system clock signal. The microprocessor includes programmed instructions contained within a read only memory (ROM) which is selectively read and implemented within the central processing unit (CPU) of the microprocessor, with the results of the operations being communicated to a random access memory (RAM) and to a data bus 114A which forms an input to a decoder 116.

Multiple sets of operating programs are stored in the read only memory (ROM), including at least a first operating program for controlling the execution of instructions issued from the CPU. The read only memory thus includes program instructions as well as stored data. The CPU includes an arithmetic and logic unit and a main control unit. The principal functional sections communicate with each other through signals that represent data, instructions and control signals during the execution of a data processing program stored within the ROM. The order, timing and direction in which this information flows is controlled by the CPU. The CPU is in turn controlled by a sequence of program instructions which are stored in the read only memory (ROM).

In the embodiment of FIG. 4, the microprocessor 114 is programmed to calculate the loading on the left and right air spring of each axle, to compare the total load per axle with a preprogrammed maximum rated load value, and to total the combined loads on all axles to produce a gross payload calculation which is compared with a preprogrammed rated gross weight value for the particular vehicle, for example 80,000 lbs., to produce a percent of total weight calculation.

The decoded digital data signals are input to a driver circuit 118 on a data bus 116A. The decoded signals are directed to the left and right array of each display Group E, Group F, Group G and alphanumeric display Group D. Display Group E, includes first and second linear arrays of L.E.D. display elements 102L and 102R, corresponding with the left side and right side of the front axle 14. Group F includes left and right linear arrays of L.E.D. display elements 104L and 104R, corresponding with the left and right sides of the drive axle 16. Display Group G includes left and right linear arrays of L.E.D. display elements 106L and 106R, which correspond with the left and right sides of the rear axle 18.

The analog pressure sensor signals from the air springs of each axle group are scaled appropriately so that the display L.E.D. elements will indicate loading up to one-half of the total load on each axle. For example, since the front axle is rated at 12,000 lbs. gross, the load range on the left side of the front axle is 0–6,000 lbs., and the load range on the right side of the front axle is 0–6,000 lbs. The analog signals 52, 54 are scaled appropriately in the analog/digital converters 80, 82 to provide minimum and full range display signals by the left and right L.E.D. display arrays. Likewise, since there are two drive axles, the analog input signals are scaled appropriately so that the Group F display will indicate empty—full range (0–17,000 lbs. gross per axle, with 8,500 lbs. per air spring).

In the example shown in FIG. 5, the loading indicated by the Group D alphanumeric display shows that the trailer has been loaded to 98 percent of its total allowable weight (80,000 lbs. gross), with the front axle being loaded on its left side air spring 22 to 100 percent of its allowable weight (6,000 lbs. gross), and with the right side air spring 24 of the front axle being loaded only to 95 percent of its allowable weight (6,000 lbs. gross). The Group F and Group G displays indicate that an overload condition has been imposed on the rear trailer axle 18, either by loading incorrectly or by shifting of a balanced load during transit. The Group F display indicates a differential loading condition on the drive axle, with the left side air spring 26 of the drive axle being loaded by as much as 15 percent more than the right side air spring 28.

The FIG. 5 display pattern suggests the possibility of a shift during transit from the forward area of the trailer to the left rear area of the trailer. That is, even though the gross payload remains unchanged, a differential loading condition from the front to the rear has occurred, with the Group G overload indicator 106X showing an overload condition on the rear axle 18. The Group E, Group F and Group G displays will also indicate an unbalanced differential loading condition which could be caused by scheduled off-loading. The air spring load monitoring system 110 thus alerts the operator to a potentially unsafe differential overload condition which should be corrected by repositioning of cargo. The load monitoring system 110 will also provide an immediate indication that the cargo has been correctly repositioned.

Accordingly, both embodiments 10, 110 of the present invention provide an improved vehicle load monitoring system for assisting a vehicle operator in correctly positioning cargo during initial loading, and maximizing the gross payload without exceeding the legal load limit, and without imposing excessive loading on vehicle components. The load monitoring system described herein indicates the load distribution from axle to axle along the length of the truck, including the front axle which can be dangerously overloaded by incorrect positioning of the trailer relative to the truck at the fifth wheel coupling. The improved visual display presents the payload distribution on the truck and the trailer which is intuitively obvious to the operator at all times during loading and transit without requiring mental calculation or other manipulation of alphanumeric data. Localized overloading on a single wheel or axle as a result of improper cargo distribution or load shifting will be immediately apparent to the operator and will require no more observation time than any other instrument on the truck control panel.

Although the invention has been described with reference to certain preferred embodiments, and with reference to a specific truck/trailer combination, the foregoing description is not intended to be construed in a limiting sense. Various modifications of the disclosed embodiments as well as alternative applications of the invention will be suggested to persons skilled in the art. It is therefore contemplated that the appended claims will cover any such modifications or embodiments that fall within the true scope of the invention.

What is claimed is:

1. Apparatus for displaying the load distribution of cargo carried by a vehicle of the type having a load bearing frame supported by left and right air springs mounted on a first axle and left and right air springs mounted on a second axle comprising, in combination:
   first and second pneumatic transducers coupled to the left and right air springs on the first axle, respectively, for separatingly sensing the internal air pressure thereof;

third and fourth pneumatic transducers coupled to the left and right air springs on the second axle, respectively, for separating sensing the internal air pressure thereof;

each transducer being adapted to produce an analog output signal proportional to the internal air pressure of the air spring to which it is coupled;

a display panel having a scale representative of a predetermined air spring load range;

first and second load display groups mounted on said display panel, said first and second display groups each including an array of visual display elements positioned at spaced locations about said scale, each visual display element being representative of a predetermined load range increment, and the visual display elements of said first and second groups being disposed for visual comparison to each other and to said scale;

third and fourth load display groups mounted on said display panel, said third and fourth display groups each including an array of discrete visual display elements positioned at spaced locations about said scale, each visual display element being representative of a redetermined load range increment, and the visual display elements of said third and fourth groups being disposed for visual comparison to each other and to said scale; and, a signal conversion circuit having multiple inputs electrically coupled to said transducers for separately receiving the air spring analog output signals and having multiple outputs electrically coupled to said display groups, respectively, for separately driving a predetermined visual display element of each display group in correspondence with the load range increment containing the air spring load value represented by the analog output signal.

* * * * *